United States Patent
Lovasz et al.

(10) Patent No.: US 10,583,724 B2
(45) Date of Patent: Mar. 10, 2020

(54) REMOVABLE VEHICLE ROOF CAP ASSEMBLIES WITH SELF-ALIGNING MOUNTING SYSTEMS

(71) Applicant: FORD GLOBAL TECHNOLOGIES, LLC, Dearborn, MI (US)

(72) Inventors: Ronald M. Lovasz, Allen Park, MI (US); David Brian Glickman, Southfield, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 90 days.

(21) Appl. No.: 15/934,222

(22) Filed: Mar. 23, 2018

(65) Prior Publication Data

US 2019/0291552 A1   Sep. 26, 2019

(51) Int. Cl.
| | | |
|---|---|---|
| B60J 7/185 | (2006.01) | |
| B60J 7/19 | (2006.01) | |
| B62D 25/06 | (2006.01) | |
| B60J 7/10 | (2006.01) | |

(52) U.S. Cl.
CPC ............. *B60J 7/1851* (2013.01); *B60J 7/106* (2013.01); *B60J 7/194* (2013.01); *B62D 25/06* (2013.01)

(58) Field of Classification Search
CPC . B60J 7/106; B60J 7/1851; B60J 7/196; B60J 7/04
USPC ....................................................... 296/102
See application file for complete search history.

(56) References Cited

U.S. PATENT DOCUMENTS

| | | | |
|---|---|---|---|
| 4,817,999 A | 4/1989 | Drew | |
| 4,830,425 A | 5/1989 | Muscat | |
| 4,861,092 A | 8/1989 | Bogard | |
| 5,470,126 A * | 11/1995 | Hines, Jr. | ................... B60J 7/04 296/219 |
| 5,489,146 A | 2/1996 | Fischbach | |
| 5,489,149 A * | 2/1996 | Akasu | ..................... G01S 7/497 356/4.01 |
| 6,386,617 B1 * | 5/2002 | Kusuma | ................... B60J 1/085 296/146.15 |
| 6,481,772 B1 * | 11/2002 | Tenn | .................... B60N 2/0284 296/146.16 |
| 6,575,521 B2 | 6/2003 | Tarahomi | |
| 6,938,949 B1 * | 9/2005 | Peart | ......................... B60J 7/11 296/107.08 |
| 6,988,767 B2 | 1/2006 | Schlachter et al. | |
| 7,900,991 B2 | 3/2011 | Fallis, III et al. | |
| 2005/0017548 A1 * | 1/2005 | Rudolph | .................. B60J 1/183 296/218 |
| 2017/0267082 A1 * | 9/2017 | Matsumoto | ................ B60J 7/08 |
| 2018/0227986 A1 * | 8/2018 | Snider | ..................... H05B 3/86 |
| 2018/0237077 A1 * | 8/2018 | Bednarek | ............ B29C 44/3484 |

* cited by examiner

*Primary Examiner* — Pinel E Romain
(74) *Attorney, Agent, or Firm* — David Coppiellie; Carlson, Gaskey & Olds

(57) ABSTRACT

This disclosure details vehicles that are equipped with one or more removable roof cap assemblies. Exemplary roof cap assemblies include a roof cap and a mounting system with one or more self-aligning brackets configured to self-articulate into alignment with one or more receiving brackets that are mounted to the vehicle.

20 Claims, 4 Drawing Sheets

REMOVABLE VEHICLE ROOF CAP ASSEMBLIES WITH SELF-ALIGNING MOUNTING SYSTEMS

TECHNICAL FIELD

This disclosure relates to removable vehicle roof cap assemblies that are equipped with self-aligning mounting systems for simplifying installation and removal of the roof cap assemblies.

BACKGROUND

Some vehicles include removable roof assemblies that may be unlatched and removed from the vehicle to provide vehicle passengers with an open air riding experience. Known removable roof assemblies are often difficult to install and remove.

SUMMARY

A vehicle according to an exemplary aspect of the present disclosure includes, among other things, a windshield header, a body structure aft of the windshield header, a roof cap removably mounted between the windshield header and the body structure, a latching assembly configured to latch the roof cap to the windshield header, and a bracket assembly configured to self-articulate into engagement with the body structure to secure the roof cap relative to the body structure.

In a further non-limiting embodiment of the foregoing vehicle, the vehicle is a pickup truck.

In a further non-limiting embodiment of either of the foregoing vehicles, the body structure is a front wall of a cargo bed of the pickup truck.

In a further non-limiting embodiment of any of the foregoing vehicles, the latching assembly includes a J-hook latch mounted near a front edge of a top surface of the roof cap and J-hook latch receiver mounted to the windshield header.

In a further non-limiting embodiment of any of the foregoing vehicles, the act of latching the J-hook latch to the J-hook latch receiver forces a portion of the bracket assembly into engagement with the body structure.

In a further non-limiting embodiment of any of the foregoing vehicles, the latching assembly is located near a front edge of a top surface of the roof cap, and the bracket assembly is located near a lower edge of a rear surface of the roof cap.

In a further non-limiting embodiment of any of the foregoing vehicles, the bracket assembly includes an alignment bracket mounted to the roof cap and a receiving bracket mounted to the body structure.

In a further non-limiting embodiment of any of the foregoing vehicles, the alignment bracket is received within an opening that extends between the body structure and the receiving bracket.

In a further non-limiting embodiment of any of the foregoing vehicles, the alignment bracket includes an upper section extending along a first longitudinal axis and a lower section extending along a second longitudinal axis that is transverse to the first longitudinal axis.

In a further non-limiting embodiment of any of the foregoing vehicles, the alignment bracket includes a plurality of notches or gripping surfaces located at an interface between the alignment bracket and the body structure.

In a further non-limiting embodiment of any of the foregoing vehicles, the receiving bracket includes a first mounting flange, a second mounting flange, and a bracket body extending between the first and second mounting flanges and bulging in a direction away from the body structure.

In a further non-limiting embodiment of any of the foregoing vehicles, the roof cap includes a window panel.

In a further non-limiting embodiment of any of the foregoing vehicles, the window panel is mounted within a rear surface of the roof cap, and a second window panel or a roof panel is removably mounted within a top surface of the roof cap.

In a further non-limiting embodiment of any of the foregoing vehicles, the window panel includes a sliding panel.

A method according to another exemplary aspect of the present disclosure includes, among other things, removably installing a roof cap assembly between a windshield header and a body structure of a vehicle. Removably installing the roof cap assembly includes physically latching the roof cap assembly to the windshield header but excludes performing any physical latching operation between the roof cap assembly and the body structure.

In a further non-limiting embodiment of the foregoing method, removably installing the roof cap assembly includes tilting a roof cap of the roof cap assembly away from the windshield header, and moving an alignment bracket that is mounted to the roof cap toward a receiving bracket that is mounted to the body structure, thereby forcing the alignment bracket to self-align within an opening extending between the body structure and the receiving bracket.

In a further non-limiting embodiment of either of the foregoing methods, the method includes tilting the roof cap toward the windshield header, thereby forcing the alignment bracket to self-articulate further through the opening.

In a further non-limiting embodiment of any of the foregoing methods, the method includes tilting the roof cap further until it is received against the windshield header, and physically latching the roof cap to the windshield header includes applying a downward latching force. Applying the downward latching force creates a rearward force that forces the alignment bracket into engagement with the body structure.

In a further non-limiting embodiment of any of the foregoing methods, removably installing the roof cap assembly includes physically latching the roof cap assembly to the windshield header with a latching assembly and mounting the roof cap assembly relative to the body structure with a self-aligning and self-articulating bracket assembly.

In a further non-limiting embodiment of any of the foregoing methods, the vehicle is a pickup truck and the body structure is a front wall of a cargo bed of the pickup truck.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicles that are equipped with one or more removable roof cap assemblies. Exemplary roof cap assemblies includes a roof cap and a mounting system with one or more self-aligning brackets configured to articulate into alignment with one or more receiving brackets that are mounted to the vehicle. These and other features of this disclosure are described in greater detail below.

Figure 1:
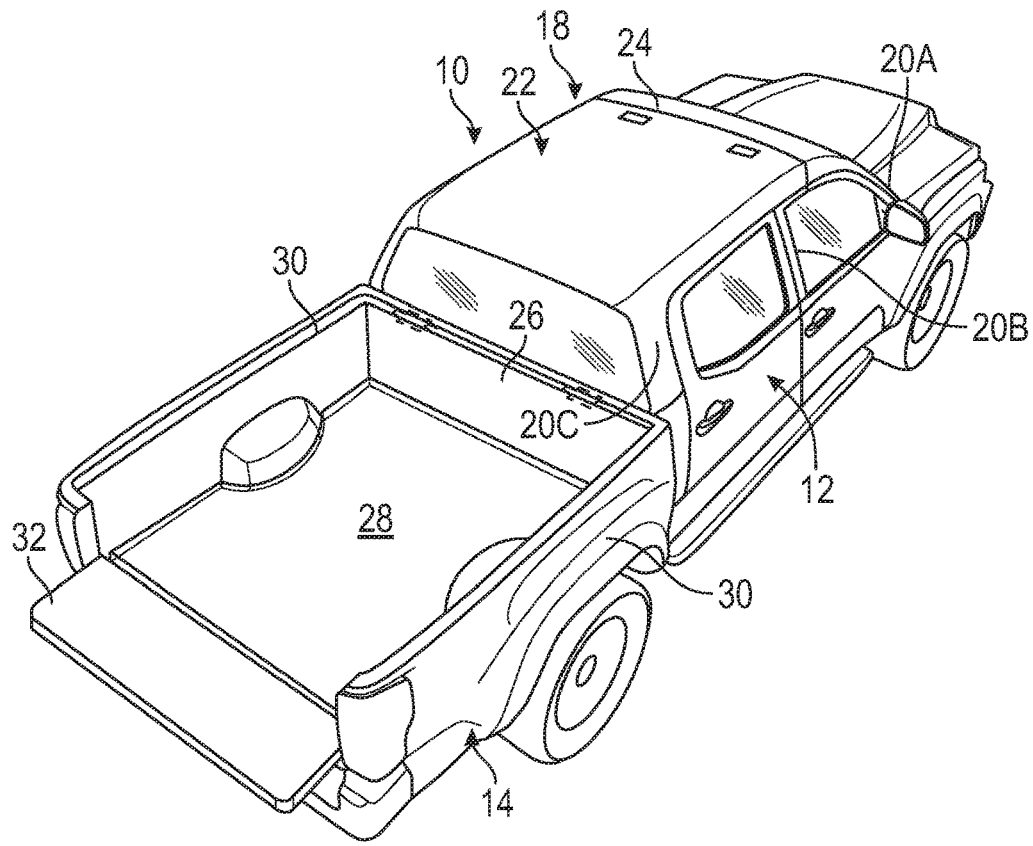
FIG. 1 illustrates a vehicle equipped with removable roof cap assembly.

FIG. 1 illustrates a vehicle 10. In an embodiment, the vehicle 10 is a pickup truck. However, the teachings of this disclosure could extend to other vehicles including cars, vans, sport utility vehicles, or any other type of vehicle that includes a removable roof assembly. The vehicle 10 could also be a conventional motor vehicle, a battery powered hybrid or electric vehicle, or an autonomous vehicle (i.e., a driverless vehicle) within the scope of this disclosure.

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 may include a passenger cab 12 and a cargo bed 14 that extends rearward of the passenger cab 12. Together, the passenger cab 12 and the cargo bed 14 establish a vehicle body 16 of the vehicle 10.

The passenger cab 12 includes a roof 18 supported by a plurality of pillars 20 of the vehicle body 16. In the illustrated embodiment, the vehicle body 16 includes A-pillars 20A, which are positioned nearest to the front of the vehicle 10, C-pillars 20C, which are positioned nearest to the cargo bed 14, and B-pillars 20B, which are located between the A-pillars 20A and the C-pillars 20C. In other embodiments, the vehicle body 16 might only include only the A-pillars 20A and the B-pillars 20B.

The roof 18 may include a roof cap assembly 22 and a windshield header 24. The roof cap assembly 22 can be removed from the roof 18 to provide vehicle passengers with an open air riding experience. In an embodiment, the roof cap assembly 22 is removably latched relative to the windshield header 24 at the A-pillars 20A and is removably secured relative to a body structure 26 located near either the B-pillars 20B or the C-pillars 20C. In an embodiment, the body structure 26 is a front wall of the cargo bed 14. As discussed in greater detail below, the roof cap assembly 22 is configured to self-articulate into alignment with the body structure 26 in order to simplify installation and removal of the roof cap assembly 22 from the passenger cab 12.

The cargo bed 14 establishes a cargo space for storing and hauling cargo at a rear location of the vehicle 10. The cargo bed 14 may include a floor 28 that extends between a pair of longitudinally extending side walls 30, the body structure 26, which extends laterally between the side walls 30, and a tailgate 32. The tailgate 32 is moveable between a closed position (not shown) and a deployed or open position. When in the closed position, the tailgate 32 generally encloses an end of the cargo bed 14 that is opposite from the body structure 26 to prevent cargo from sliding out of the cargo bed 14. When in the open position, the tailgate 32 is generally horizontal and thus parallel to ground level such that cargo can be loaded onto or unloaded from the cargo bed 14.

Figure 2:
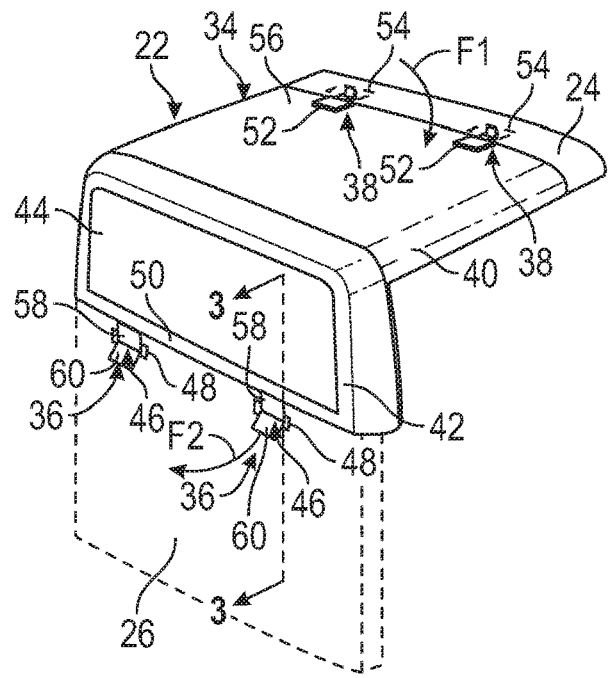
FIG. 2 illustrates the removable roof cap assembly of FIG. 1.

FIG. 2 further illustrates the roof cap assembly 22. The roof cap assembly 22 may include a roof cap 34 and a mounting system having one or more bracket assemblies 36 for securing the roof cap 34 to the body structure 26 and one or more latching assemblies 38 for securing the roof cap 34 to the windshield header 24.

The roof cap 34 may include a top surface 40 and a rear surface 42. In an embodiment, the rear surface 42 extends transversely from a rear end of the top surface 40 to establish an L-shaped roof cap 34. The roof cap 34 may be constructed of a metallic material, a plastic material, or a composite material. However, the shape, size, and material make-up of the roof cap 34 are not intended to limit this disclosure.

A window panel 44, which may be referred to as a backlite, may be mounted within the rear surface 42 of the roof cap 34. The window panel 44 is a fixed panel, in an embodiment.

In an embodiment, the mounting system of the roof cap assembly 22 includes two bracket assemblies 36 for securing the rear surface 42 of the roof cap 34 relative to the body structure 26. However, the roof cap assembly 22 could include any amount of bracket assemblies 36. The total number of bracket assemblies 36 utilized may depend on a variety of design specific factors including but not limited to the sizes of the body structure 26 and the roof cap 34.

Each bracket assembly 36 may include an alignment bracket 46 and a receiving bracket 48 that is a separate bracket from the alignment bracket 46. The alignment bracket 46 is mounted to a lower edge 50 of the rear surface 42 of the roof cap 34, and the receiving bracket 48 is mounted to the body structure 26. The alignment bracket 46 and the receiving bracket 48 can be mounted using any fastening technique. As discussed in greater detail below, the receiving bracket 48 is configured to receive the alignment bracket 46 in a manner in which the alignment bracket 46 may self-articulate into alignment with the receiving bracket 48 to removably secure the rear surface 42 of the roof cap 34 to the body structure 26.

In an embodiment, the mounting system of the roof cap assembly 22 further includes two latching assemblies 38 for securing the top surface 40 of the roof cap 34 relative to the windshield header 24. However, the roof cap assembly 22 could include any amount of latching assemblies 38. The total number of latching assemblies 38 utilized may depend on a variety of design specific factors including but not limited to the sizes of the body structure 26 and the roof cap 34.

In an embodiment, the latching assemblies 38 each include a J-hook latch 52 and a separate J-hook latch receiver 54. The J-hook latch 52 may be mounted near a front edge 56 of the top surface 40 of the roof cap 34, and the J-hook latch receiver 54 may be mounted to the windshield header 24. The J-hook latch 52 may latch to the J-hook latch receiver 54 to removably secure the top surface 40 of the roof cap 34 to the windshield header 24. However, other types of latching mechanisms could also be utilized to secure the top surface 40 to the windshield header 24 within the scope of this disclosure.

Figure 3:
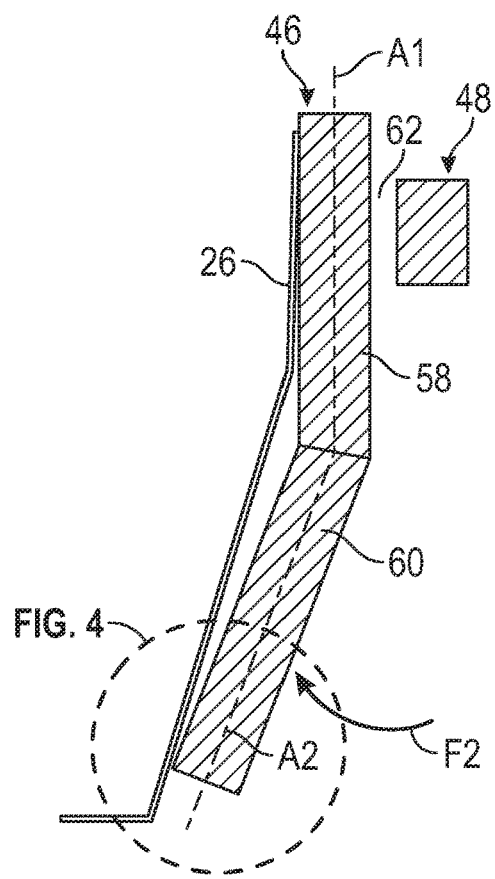
FIG. 3 is a cross-sectional view through section 3-3 of FIG. 2.

Referring now to FIGS. 2 and 3, the alignment bracket 46 may include an upper section 58 that is mounted to the lower edge 50 of the rear surface 42 of the roof cap 34, and a lower section 60 that extends from the upper section 58. The upper section 58 may extend along a first longitudinal axis A1, and the lower section 60 may extend along a second longitudinal axis A2 that is transverse to the first longitudinal axis A. In an embodiment, the upper section 58 and the lower section 60 establish a V-shaped body of the alignment bracket 46.

The alignment bracket 46 may be received within an opening 62 that extends between the body structure 26 and the receiving bracket 48. The alignment bracket 46 is designed to self-articulate into place within the opening 62 during installation of the roof cap 34. For example, a downward latching force F1 that is created at the windshield header 24 when the J-hook latches 52 are latched to the J-hook latch receivers 54 creates a rearward force F2 that forces the alignment bracket 46 into engagement with the body structure 26. Therefore, the roof cap assembly 22 can be installed (or removed) by physically operating only the latching assemblies 38 at the front edge 56 of the top surface 40 of the roof cap 34, and the bracket assemblies 36 self-engage the body structure 26 without the need for the user to perform any specific latching operation at the lower edge 50 of the rear surface 42 of the roof cap 34.

The alignment bracket(s) 46 may be made of materials that avoid damaging the body structure 26 during installation and removal of the roof cap 34. In an embodiment, the alignment bracket 46 is made of nylon. In another embodiment, the alignment bracket 46 is made of a plastic dipped steel. Other materials or combination of materials may also be suitable.

Figure 4:
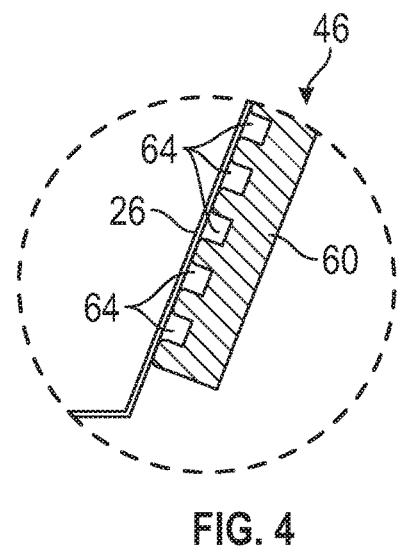
FIG. 4 is a blown-up view of a region of FIG. 3.

Referring now to FIG. 4, the lower section 60 of the alignment bracket 46 may optionally include a plurality of notches 64. The notches 64 may be disposed along the portion of the lower section 60 that interfaces with the body structure 26 when the rearward force F2 is being applied. The notches 64 create air gaps between the lower section 60 and the body structure 26. The air gaps reduce the amount of squeak, rattle, and noise that is produced as the alignment bracket 46 articulates against the body structure 26.

Figure 5:
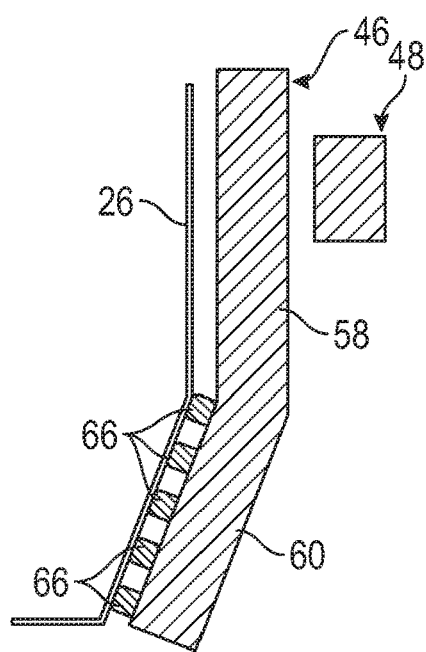
FIG. 5 illustrates optional griping surfaces of an alignment bracket of a removable roof cap assembly.

In another embodiment, shown in FIG. 5, the alignment bracket 46 may optionally include a plurality of gripping surfaces 66. The gripping surfaces 66 may protrude outwardly from the lower section 60 and are configured to grip against the body structure 26 as the rearward force F2 is being applied. In an embodiment, the gripping surfaces 66 are rubber gripping surfaces.

Figure 6:
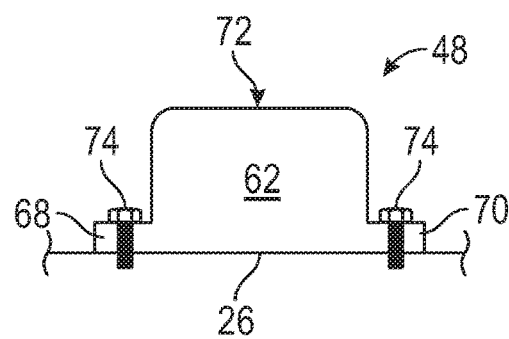
FIG. 6 illustrates a top view of a receiving bracket of a removable roof cap assembly.

FIG. 6 illustrates the receiving bracket 48 in a mounted position relative to the body structure 26. The receiving bracket 48 may include a first mounting flange 68, a second mounting flange 70, and a bracket body 72 extending between the first and second mounting flanges 68, 70. The first and second mounting flanges 68, 70 may be mounted to the body structure 26 by fasteners 74, such as bolts or screws. In an embodiment, the bracket body 72 bulges in an outward direction (i.e., toward the passenger cab 12) from the body structure 26 in order to establish the opening 62 for receiving the alignment bracket 46. The bracket body 72 acts as a catch for guiding the alignment bracket 46 into position relative to the body structure 26 during installation of the roof cap 34. The bracket body 72 also prevents the upper section 58 of the alignment bracket 46 from becoming displaced from the body structure 26 as the rearward force F2 is being applied.

Figure 7:
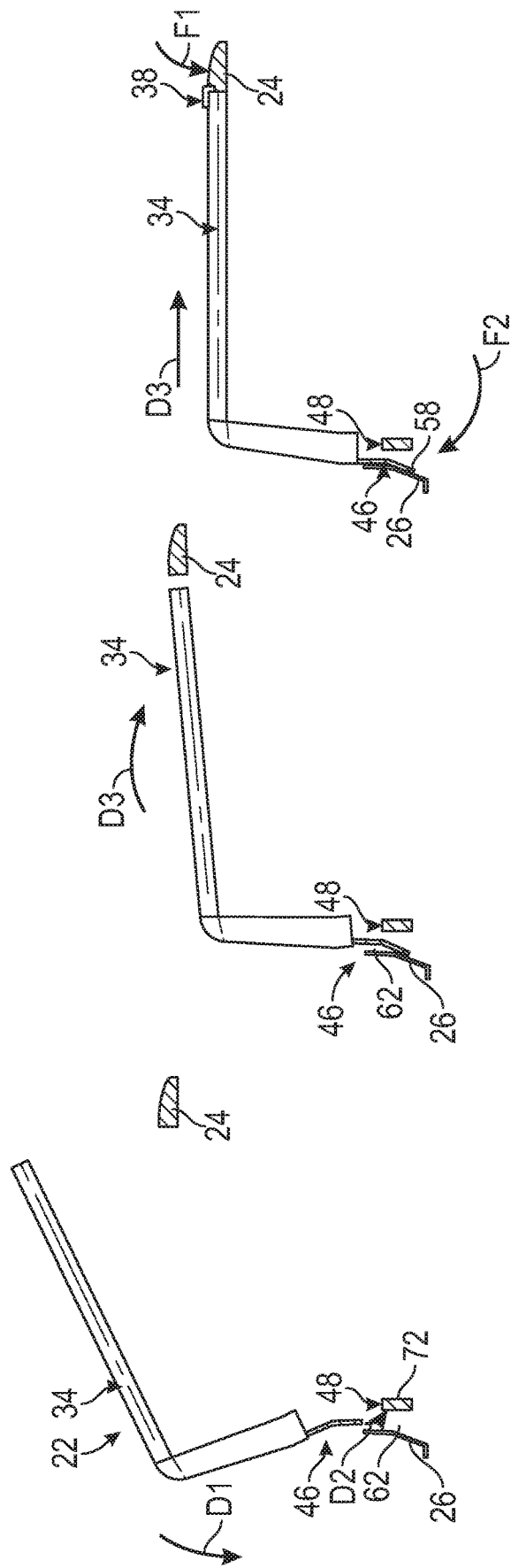
FIGS. 7A, 7B, and 7C schematically illustrate a method of installing a removable roof cap assembly onto a vehicle.

FIGS. 7A, 7B, and 7C schematically illustrate the installation of the roof cap assembly 22 onto the vehicle 10. The roof cap assembly 22 and its various components are not necessarily drawn to scale in these figures and in many cases are exaggerated to better illustrate the installation technique.

First, as illustrated in FIG. 7A, the roof cap 34 of the roof cap assembly 22 may be tilted slightly in a rearward direction D1 (i.e., in a direction away from the windshield header 24), and the alignment bracket 46 may then be moved in a direction D2 toward the receiving bracket 48. The direction D2 may be at a slight angle relative to the receiving bracket 48. The alignment bracket 46 may contact the receiving bracket 48, and more particularly the bracket body 72, as it is moved further in the direction D2, thereby forcing the alignment bracket 46 to self-align within the opening 62.

Next, as shown in FIG. 7B, the roof cap 34 of the roof cap assembly 22 may be tilted in a forward direction D3 (i.e., in a direction towards the windshield header 24). As this occurs, the alignment bracket 46 may self-articulate further down into the opening 62 established between the receiving bracket 48 and the body structure 26.

The roof cap 34 may continue to be moved in the forward direction D3 until it is received against the windshield header 24. This is shown schematically at FIG. 7C. The downward latching force F1 is created when the front edge 56 of the top surface 40 of the roof cap 34 is latched to the windshield header 24 (e.g., by physically actuating the latching assemblies 38), thereby creating the rearward force F2 that forces the alignment bracket 46 into engagement with the body structure 26. Therefore, the roof cap assembly 22 can be installed without the need to physically operate latches or other actuable connectors at the rear surface 42 of the roof cap 34.

Removal of the roof cap 34 may be achieved by unlatching the roof cap 34 from the windshield header 24 (e.g., by disengaging the latching assemblies 38) and then tilting the roof cap 34 in the rearward direction D1 until the alignment brackets 46 can be removed from the receiving brackets 48.

Figure 8:
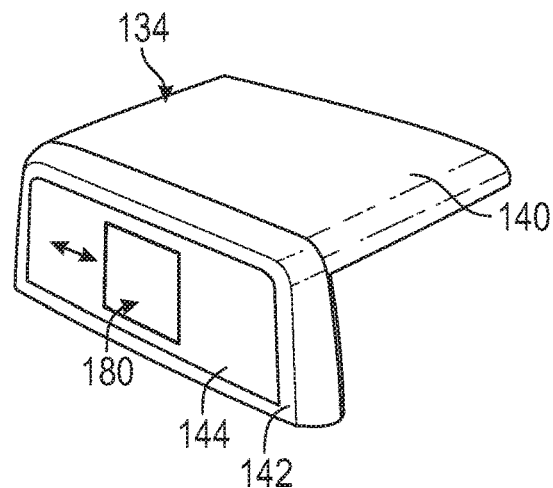
FIG. 8 illustrates an exemplary roof cap of a removable roof cap assembly for a vehicle.

FIG. 8 illustrates another exemplary roof cap 134 that may be utilized as part of the roof cap assembly 22 described above. In this embodiment, the roof cap 134 includes a top surface 140 and a rear surface 142. A window panel 144, which may be referred to as a backlite, may be mounted within the rear surface 142 of the roof cap 134. The window panel 144 includes a sliding panel 180, in this embodiment. The sliding panel 180 may be moved between closed and open positions to provide an open air experience even when the roof cap 134 is installed on the vehicle 10.

Figure 9:
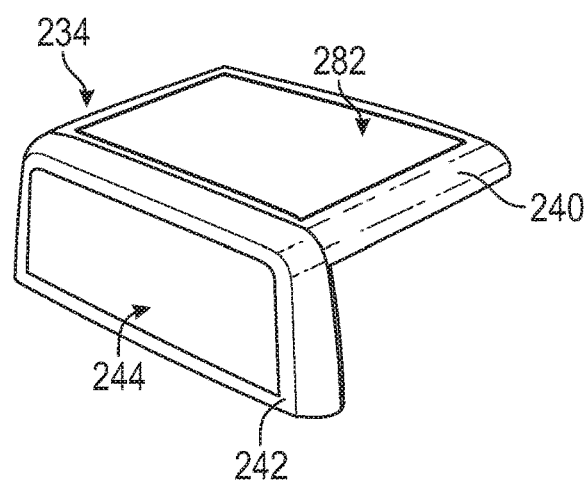
FIG. 9 illustrates another exemplary roof cap.

FIG. 9 illustrates another exemplary roof cap 234 that may be utilized as part of the roof cap assembly 22 described above. In this embodiment, the roof cap 234 includes a top surface 240 and a rear surface 242. A window panel 244 may be mounted within the rear surface 242 of the roof cap 234, and a roof panel 282 may be removably mounted within the top surface 240. The roof panel 282 may be removed from the top surface 242 to provide an open air experience even when the roof cap 234 is installed on the vehicle 10.

Figure 10:
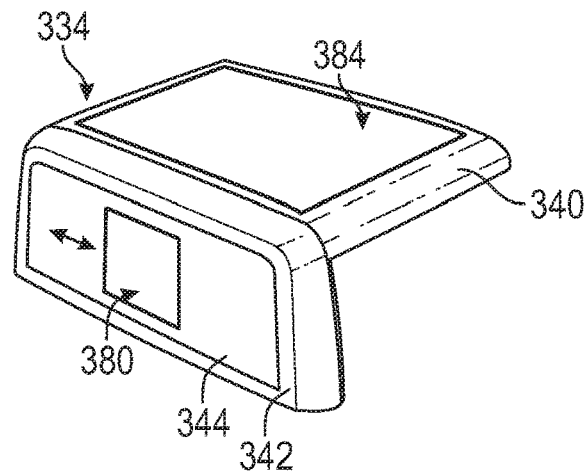
FIG. 10 illustrates yet another exemplary roof cap.

FIG. 10 illustrates yet another exemplary roof cap 334 that may be utilized as part of the roof cap assembly 22 described above. In this embodiment, the roof cap 334 includes a top surface 340 and a rear surface 342. A first window panel 344 may be mounted within the rear surface 342 of the roof cap 334, and a second window panel 384 may be removably mounted within the top surface 340. The window panel 344 may include a sliding panel 380. The sliding panel 380 may be moved between closed and open positions and the second window panel 384 may be removed from the top surface 342 to provide an open air experience even when the roof cap 334 is installed on the vehicle 10.

The removable roof cap assemblies of this disclosure are equipped with self-aligning mounting systems that significantly simplify installation and removal of the roof cap assemblies. The removable roof cap assemblies can therefore be removed or installed by a single person and only require operating latches at the windshield header side of the removable roof cap assemblies.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle, comprising:
   a windshield header;
   a body structure aft of the windshield header;
   a roof cap removably mounted between the windshield header and the body structure;
   a latching assembly configured to latch the roof cap to the windshield header; and
   a bracket assembly configured to self-articulate into engagement with the body structure to secure the roof cap relative to the body structure,
   wherein the bracket assembly includes an alignment bracket mounted to the roof cap and a receiving bracket mounted to the body structure,
   wherein the receiving bracket is mounted within a space extending between the body structure and a passenger cab of the vehicle.

2. The vehicle as recited in claim 1, wherein the vehicle is a pickup truck.

3. The vehicle as recited in claim 2, wherein the body structure is a front wall of a cargo bed of the pickup truck.

4. The vehicle as recited in claim 1, wherein the latching assembly includes a J-hook latch mounted near a front edge of a top surface of the roof cap and J-hook latch receiver mounted to the windshield header.

5. The vehicle as recited in claim 4, wherein latching the J-hook latch to the J-hook latch receiver forces a portion of the bracket assembly into engagement with the body structure.

6. The vehicle as recited in claim 1, wherein the latching assembly is located near a front edge of a top surface of the roof cap and the bracket assembly is located near a lower edge of a rear surface of the roof cap.

7. The vehicle as recited in claim 1, wherein the alignment bracket is received within an opening that extends between the body structure and the receiving bracket.

8. The vehicle as recited in claim 1, wherein the roof cap includes a window panel.

9. The vehicle as recited in claim 8, wherein the window panel is mounted within a rear surface of the roof cap, and comprising a second window panel or a roof panel removably mounted within a top surface of the roof cap.

10. The vehicle as recited in claim 8, wherein the window panel includes a sliding panel.

11. A method, comprising:
    removably installing a roof cap assembly between the windshield header and the body structure of the vehicle of claim 1, wherein removably installing the roof cap assembly includes physically latching the roof cap assembly to the windshield header and excludes performing any physical latching operation between the roof cap assembly and the body structure.

12. The method as recited in claim 11, wherein removably installing the roof cap assembly includes:
    tilting the roof cap of the roof cap assembly away from the windshield header; and
    moving the alignment bracket that is mounted to the roof cap toward the receiving bracket that is mounted to the body structure, thereby forcing the alignment bracket to self-align within an opening extending between the body structure and the receiving bracket.

13. The method as recited in claim 12, comprising:
    tilting the roof cap toward the windshield header, thereby forcing the alignment bracket to self-articulate further through the opening.

14. The method as recited in claim 13, comprising:
    tilting the roof cap further until it is received against the windshield header; and
    wherein physically latching the roof cap to the windshield header includes applying a downward latching force;
    wherein applying the downward latching force creates a rearward force that forces the alignment bracket into engagement with the body structure.

15. The method as recited in claim 11, wherein removably installing the roof cap assembly includes:
    physically latching the roof cap assembly to the windshield header with the latching assembly; and
    mounting the roof cap assembly relative to the body structure with the bracket assembly.

16. The method as recited in claim 11, wherein the vehicle is a pickup truck and the body structure is a front wall of a cargo bed of the pickup truck.

17. The vehicle as recited in claim 1, wherein alignment bracket is at least partially comprised of a plastic material.

18. A vehicle, comprising:
    a windshield header;
    a body structure aft of the windshield header;
    a roof cap removably mounted between the windshield header and the body structure;
    a latching assembly configured to latch the roof cap to the windshield header; and
    a bracket assembly configured to self-articulate into engagement with the body structure to secure the roof cap relative to the body structure, wherein the bracket assembly includes an alignment bracket mounted to the roof cap and a receiving bracket mounted to the body structure, wherein the alignment bracket includes an upper section extending along a first longitudinal axis and a lower section extending along a second longitudinal axis that is transverse to the first longitudinal axis.

19. A vehicle, comprising:

a windshield header;

a body structure aft of the windshield header;

a roof cap removably mounted between the windshield header and the body structure;

a latching assembly configured to latch the roof cap to the windshield header; and a bracket assembly configured to self-articulate into engagement with the body structure to secure the roof cap relative to the body structure, wherein the bracket assembly includes an alignment bracket mounted to the roof cap and a receiving bracket mounted to the body structure, wherein the alignment bracket includes a plurality of notches or gripping surfaces located at an interface between the alignment bracket and the body structure.

20. A vehicle, comprising:

a windshield header;

a body structure aft of the windshield header;

a roof cap removably mounted between the windshield header and the body structure;

a latching assembly configured to latch the roof cap to the windshield header; and a bracket assembly configured to self-articulate into engagement with the body structure to secure the roof cap relative to the body structure, wherein the bracket assembly includes an alignment bracket mounted to the roof cap and a receiving bracket mounted to the body structure, wherein the receiving bracket includes a first mounting flange, a second mounting flange, and a bracket body extending between the first and second mounting flanges and bulging in a direction away from the body structure.

\* \* \* \* \*